(12) United States Patent
Vasudevan

(10) Patent No.: US 11,416,533 B2
(45) Date of Patent: Aug. 16, 2022

(54) SYSTEM AND METHOD FOR AUTOMATED KEY-PERFORMANCE-INDICATOR DISCOVERY

(71) Applicant: Gauthaman Vasudevan, Old Bridge, NJ (US)

(72) Inventor: Gauthaman Vasudevan, Old Bridge, NJ (US)

(73) Assignee: Avlino Inc., Holmdel, NJ (US)

( * ) Notice: Subject to any disclaimer, the term of this patent is extended or adjusted under 35 U.S.C. 154(b) by 874 days.

(21) Appl. No.: 15/615,817

(22) Filed: Jun. 6, 2017

(65) Prior Publication Data

US 2017/0351689 A1 Dec. 7, 2017

Related U.S. Application Data

(60) Provisional application No. 62/346,545, filed on Jun. 6, 2016.

(51) Int. Cl.
| | |
|---|---|
| *G06F 16/35* | (2019.01) |
| *G06Q 10/06* | (2012.01) |
| *G06N 5/00* | (2006.01) |
| *G06N 3/12* | (2006.01) |
| *G06N 20/20* | (2019.01) |
| *G06F 40/30* | (2020.01) |
| *G06F 40/279* | (2020.01) |

(52) U.S. Cl.
CPC .......... *G06F 16/355* (2019.01); *G06F 16/358* (2019.01); *G06F 40/279* (2020.01); *G06F 40/30* (2020.01); *G06N 3/126* (2013.01); *G06N 5/003* (2013.01); *G06N 20/20* (2019.01); *G06Q 10/0637* (2013.01)

(58) Field of Classification Search
None
See application file for complete search history.

(56) References Cited

U.S. PATENT DOCUMENTS

| | | | |
|---|---|---|---|
| 9,439,081 B1* | 9/2016 | Knebl | H04W 16/18 |
| 2007/0055564 A1* | 3/2007 | Fourman | G06Q 10/06393 705/7.39 |
| 2012/0029977 A1* | 2/2012 | Alcorn | G06Q 10/06393 705/7.39 |
| 2013/0132108 A1* | 5/2013 | Solilov | G16H 50/70 705/2 |
| 2015/0379126 A1* | 12/2015 | Livshits | G06Q 10/10 707/722 |
| 2016/0104090 A1* | 4/2016 | Alekseyev | G06Q 10/06393 705/7.39 |
| 2016/0285700 A1* | 9/2016 | Gopalakrishnan | G06N 7/005 |
| 2017/0099525 A1* | 4/2017 | Ray | H04N 21/25883 |
| 2017/0139816 A1* | 5/2017 | Sapozhnikov | G06F 8/60 |
| 2017/0235859 A1* | 8/2017 | Delisle | H04L 67/32 703/22 |
| 2018/0114128 A1* | 4/2018 | Libert | G06N 5/045 |

* cited by examiner

*Primary Examiner* — Christopher J Raab
(74) *Attorney, Agent, or Firm* — Travis Lee Johnson; Ascentage Patent Law, LLC

(57) ABSTRACT

Various methods and systems of statistical data processing and natural-language-processing are disclosed. According to one embodiment, an intelligent, automated KPI-discovery method uses existing machine-learning algorithms and Natural Language Processing (NLP) for extraction and construction of KPIs.

14 Claims, 4 Drawing Sheets

SYSTEM AND METHOD FOR AUTOMATED KEY-PERFORMANCE-INDICATOR DISCOVERY

CROSS-REFERENCE TO RELATED APPLICATIONS

This application claims the benefit of the filing date of U.S. Provisional Application No. 62/346,545, filed on Jun. 6, 2016, the teachings of which are incorporated herein by reference. Any changes herein to that application's teachings shall not waive or disclaim any subject matter disclosed therein.

FIELD OF THE INVENTION

The present disclosure relates to statistical modeling, machine learning, and pattern recognition, and, in particular, to the discovery, selection, or creation of input variables, indicators or Key Performance Indicators (PKIs).

BACKGROUND

In the field of statistics, an independent, explanatory, input, predictor, controlled, or manipulated variable is known as a Key Performance Indicator (KPI). KPI is a feature in the fields of machine learning and pattern recognition. KPI values sometimes originate from raw data sources, and other times are functions of several input parameters. Input data or input variables include raw data gathered for use in data analysis and predictive modeling. Raw input data may not always give optimal predictions. The input variable amalgamated from simple to complex ways to create new input variables or KPIs. A simple example is the sales price of product and cost of building a product are useful raw input variables, a more useful variable or KPI is the profit margin of the product (sale price of product−cost price of product)/sale price of product. Many times, input data must be preprocessed in a sophisticated way to yield a useful KPI.

SUMMARY OF THE DISCLOSURE

The present disclosure provides an intelligent, automated KPI-discovery method using existing machine-learning algorithms and Natural Language Processing (NLP) for extraction and construction of KPIs. To the inventors' knowledge, a KPI-discovery method using Natural Language Processing to extract and construct KPIs has not previously been put into practice in industry.

The primary concept is that, if every possible combination is tried, then one will find the relevant KPIs from a given set of data. This search space is extremely large and time consuming to try all possible permutations and combinations. The patent aims to reduce this search space significantly, and, by doing so, to create useful input variables or KPIs within a reasonable time. The present disclosure contemplates using one or more of the following techniques.

1. Text information. Process the text to extract relationship between the input variables and operators. This information is then used to reduce the search space or bias the search space and thus reducing the time and cost to find new KPIs.
2. Machine learning algorithms such as Random Forest (Decision Trees), PCA, Linear Regression and the like to build models from where relationship between variables and the operator can be extracted. This information is then used to reduce the search space or bias the search space.

In one embodiment, a method of statistical data processing comprises: computationally processing business document, emails, design documents, technical literature, social data, and web data to reveal data relationships, such as covariant quantities in a dataset, and the operations describing the data relationships; computationally processing the discovered data relationships to discover and select raw-input variables as an initial set of KPIs; analyzing, with supporting software, the discovered relationships, and determining whether further consolidation of variables is possible; and automatically constructing a second, more-accurate set of KPIs from the raw data, thereby obviating the intense effort and intellectual expertise demanded of a data scientist.

In another embodiment, a method of statistical data processing comprises: providing a data set having input variables; inputting the data set to a machine-learning algorithm configured to identify correlations between the input variables; and using the identified correlations, generating a key performance indicator from a given set of input variables.

In another embodiment, a method of statistical data processing comprises: providing a data set having text comprising input variables that are related by one or more operators; processing the text to identify one or more first correlations between the input variables and the one or more operators; at least one of: (i) using the identified first correlations, reducing the data set or search space; and (ii) creating a bias toward one or more of the input variables; and using the reduced data set or created bias, generating a key performance indicator from the input variables.

In other embodiments, a statistical data-processing system comprises one or more processors; and a non-transitory computer-readable medium that has executable code stored thereon, which, when executed by the one or more processors, causes the statistical-data-processing system to carry out the methods described herein.

BRIEF DESCRIPTION OF THE DRAWINGS

The present application includes the following figures, which are exemplary in nature and are not intended to represent all of the possible embodiments of the disclosure.

DETAILED DESCRIPTION

Figure 1:
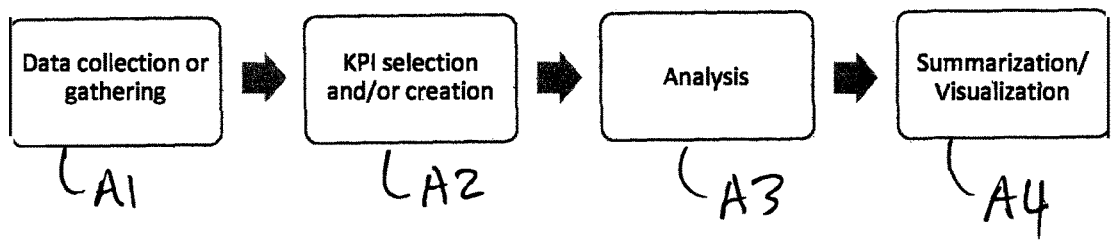
FIG. 1 is a diagram of a data-analysis process.

As illustrated in FIG. 1, in one embodiment, a data-analysis process A5 has four steps. The first step A1 is data collection or gathering. The second step A2 is KPI discovery, selection, and/or creation. The third step A3 is analysis of the data using the selected KPIs. The fourth step A4 is summarization and/or visualization of the results.

Good data analysts iterate over the second through fourth steps while tuning their models. The present inventors have recognized the problem that the second step A2 in the process outlined above is particularly challenging, because a data analyst typically starts out with a small or large database of numerical data associated with a phenomenon that he or she is trying to model. But the data analyst has no help in deciding what derived values are best, or which subset of the larger data to use to generate the best results. The data analyst relies on his or her domain knowledge, experience, and intuition to offer a good starting point and construct one or more initial hypotheses, and then he conducts a wide array of experiments to confirm or invalidate the hypotheses. The present inventors have realized that this process is limited to that specific person's knowledge and creativity, in part because the data analyst may simply be unaware of arbitrarily complicated correlations that exist between columns in the input data. Embodiments of the disclosure solve this and other problems in existing data-analyzing techniques.

There is usually ample business and technical documentation that describes the various variables and their interconnections. Some of these documents clearly state the mathematical relationships between readily available raw values. Statistical computations can be performed to confirm correlations found in text and to find other hypothesized or unforeseen relationships.

Embodiments of the disclosure provide an intelligent solution to simplify the task of discovering, selecting, and/or creating KPIs from raw data sources and related documents (i.e., step A2 in FIG 1).

There are two principal steps of KPI discovery. The first step is finding or extracting the raw data or input variables needed to construct a good model. To find or extract the correct raw data or input variables, an analyst must identify parameters by which to do so. This is a task with unique challenges. In any domain, identifying the data or variable parameters is difficult and is typically done by a domain expert along with a data analyst.

The second step of KPI discovery is statistical analysis of the raw data and use of domain expertise to understand complex interrelationships between columns in the raw dataset. This second step is a task of unbounded complexity that requires a great deal of mathematical sophistication and industry knowledge from the data analyst with significant domain expertise.

Fortunately, there is often ample business and technical documentation that describes the various variables, available configurations, and the like. Some of these documents clearly state the mathematical relationships between readily available raw values, and statistical computations can often be performed to confirm correlations found in text, as well as to find undocumented relationships. Embodiments of the disclosure provide an intelligent solution to simplify the task of discovering input variables and selecting KPIs based on those input variables.

Natural Language Processing can be used to summarize a text and to discover relationships between values being described therein. In particular, word vectorization, syntax graphs, and N-grams (also known as shingles) are useful for this purpose. Word vectorization is the encoding of textual information in floating-point vectors, from which semantic and syntactic relationships can be extracted from angles between the word vectors and mathematical operations performed upon the word vectors. Syntax graphs are mathematical and graphical representations of human language. N-grams are recurring tuples of words in a text. Mathematical analysis of the frequencies of certain tuples offers insight into the principal themes of a text and the functions of words.

The combination of these techniques permits uncovering mathematical relationships between words. For example, one extracted relationship is the equivalence among words—e.g., equivalent words (such as speed and velocity. The second extracted relationship is correlation among words—e.g., "speed is related to distance over time".

An exemplary model trained on open public data, such as an elementary-algebra text, indicates that buses and trucks often drive with certain numerical speed or velocity or rate. The model also indicates that the terms "speed", "velocity", and "rate" are approximately the same concept, but N-grams reveal that there may be an interesting relationship between 'rate', 'exchange', and 'money' as well.

It can also be seen that, for various placeholders ("*"), the trigram (distance, *, time) indicates that the placeholder "*" ought to be approximately the same operation (or operator). For example, "divided by" and "over" are computed in the same fashion. Subsequently, a KPI called "rate" emerges as a function of two input variables, "distance" and "time" (from the basic formula of distance/time=rate). The relationship and information extraction can contain errors. In one embodiment, the errors are addressed and taken care by bias and genetic programming.

Technical literature expresses mathematical relationships between values in similarly plain English. This information can be extracted to determine which values are often scaled by a constant, and which other values often have more interesting correlations. As an example, technical documentation is available for computer networks. Error codes are stored in routers, Wi-Fi cards, and other related devices. When an analyst uses these error codes to classify errors, it would be helpful to know which errors are related to the various classes of errors—and this information is freely available in the device documentation. Through Natural Language Processing, the KPI-discovery method finds that six E500 error codes per minute may indicate an error of type X.

Business documentation, design documents, and emails contain information that show relationship and value—e.g., sales being dependent on quarter or season and the like. These documents are processed to build an information relationship in various forms—word distances, pairs, graphs, and hierarchical graphs.

Embodiments of the disclosure employ a method that delves much deeper, using mathematics to verify that the input data exhibits the interrelations described in the text, and to see if any correlations have been overlooked.

In one embodiment, a first step is to gather the relevant material, to train the Natural Language Processing system, and to perform numeric analysis of the existing input data. A system embodying the KPI-discovery method learns by using a pertinent training set to build the vectors of words, n-grams, sentences, paragraphs, documents, graphs and N-grams. In one embodiment, the training set includes manuals, publications, articles, and/or books about the problem domain, for example. The second step is to cluster or build the information relationship of the various parameters into groups that are relevant and useful. The groups are based on factors such as technology (e.g. 100M Ethernet, 1G Ethernet, Wi-Fi), type of metric (e.g. link error, bit error), usage (e.g. unicast, multicast, broadcast), manufacturer (e.g. Cisco, Siemens), etc. There are various clusters that are created—e.g., such group-related counters as 100-MB Ethernet counters, 1-GB Ethernet counters, or 10-GB Ethernet counters.

The more-interesting KPIs are those that represent computation information. Documentation specifies certain KPIs as functions of raw data by specifying mathematical operations to be performed upon the data, and these KPIs should be able to be located efficiently. Expressions such as "sum," "added to," "total of," and "increased by" describe addition, while the expressions "per," "out of," and the like describe division. Word vectorization encodes similar words with similar vectors, so the operations in a text may be shown by (1) clustering word vectors and then (2) finding a cluster that contains well-known mathematical operators. Identifying the N-grams associated with the operators automatically yields usable KPIs, because phrases like "error per hour" are found without a single page of documentation being read by the analyst.

KPI creation can be done independently of the numerical-data analysis, but a more-thorough solution is to combine the information from text with information about the numerical and statistical properties of raw input data, such as histograms, variances, co-variances, factor analyses, principal-component analyses, decision trees, and the like. There are various distinct sources or source groups of input variables sharing certain characteristics and related computation words that provide relationship information. The relationship of all of these layers over one another is used to identify and create or build the KPI.

It is impractical to investigate every possible correlation between the columns in the raw data set. By first examining the documentation related to a dataset, the KPI-discovery method intelligently and automatically uncovers arbitrarily obscure correlations that reduce subsets of the raw data into a single, meaningful value. Subsequent statistical analysis verifies the explanations provided by the text analysis and can find basic relationships not mentioned in the text.

Mathematically, if every possible combination is tested out, then the right set of input variables and KPI can be determined. As a practical matter, however, building and testing out all possible combinations for any realistic case are unfeasible, because the number of input variables and their interrelationships and operators increase exponentially, as the trial size grows. The search space is too large to be practical.

Textual and statistical analyses as used in embodiments of the disclosure help reduce the search space or domain dramatically. To be even more effective, various computational words can be ordered in priority depending on their prominence. Thus, for example, the problem could be (1) bounded to explore only the top N words, or (2) bounded by time.

A large number of KPIs can be discovered by using various intelligent groupings and by applying a related computation. The computation need not be a simple sum, percentage, or ratios, but may be as complex as desired—for example, a measure of change, time series, or the like.

The search space reduction can be done using primarily the input table of data alone or along with extended information, such as various textual information from design and troubleshooting guides, public data, and online data.

The search space can be reduced to a large degree through the use of one or more machine-learning algorithms, such as the algorithms known as "Principle Component Analysis", "linear regression", "random forest", and the like. The decision trees show the relationship between variables and so some degree even the operator. The information gain between the variables along with the position between the variables is used to find the related variables. The various conditional operators between the variables is used prioritize or find the operators. In this way, the random-forest algorithm can be used to create new enhanced variables or KPIs. This information, in turn, can be used to create a useful subsets, operators, or bias to drive the creation of KPIs.

Figure 2:
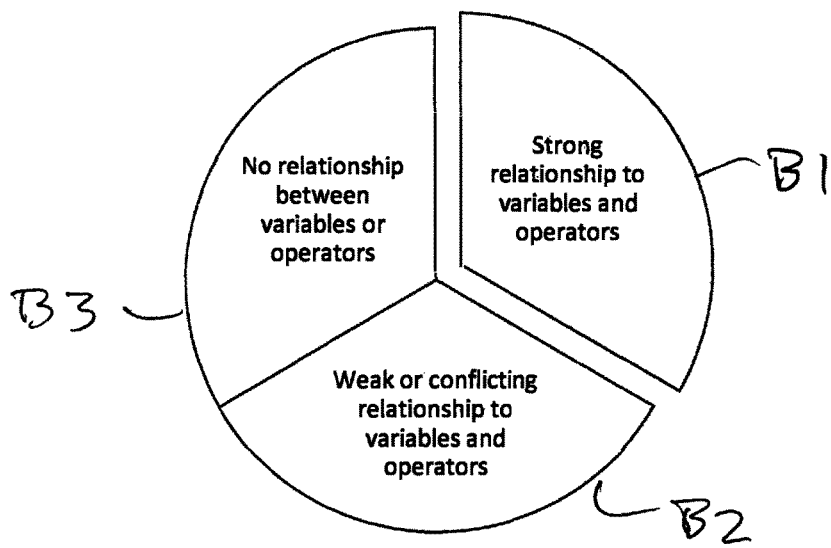
FIG. 2 is a diagram depicting three categories of data relationships.

As FIG. 2 illustrates, the search space or available raw input can be split into three segments. The first segment B1 includes a group of input variables with a strong textual correlation among them, along with strong first and second order operators. The second segment B2 includes one or more groups of input variables based on a weak interrelationship, or those with conflicting relationships between text information and numerical analysis, or those not directly related to input variables. The third segment B3 includes the independent input variables that show no correlation to a variable or operator.

Figure 3:
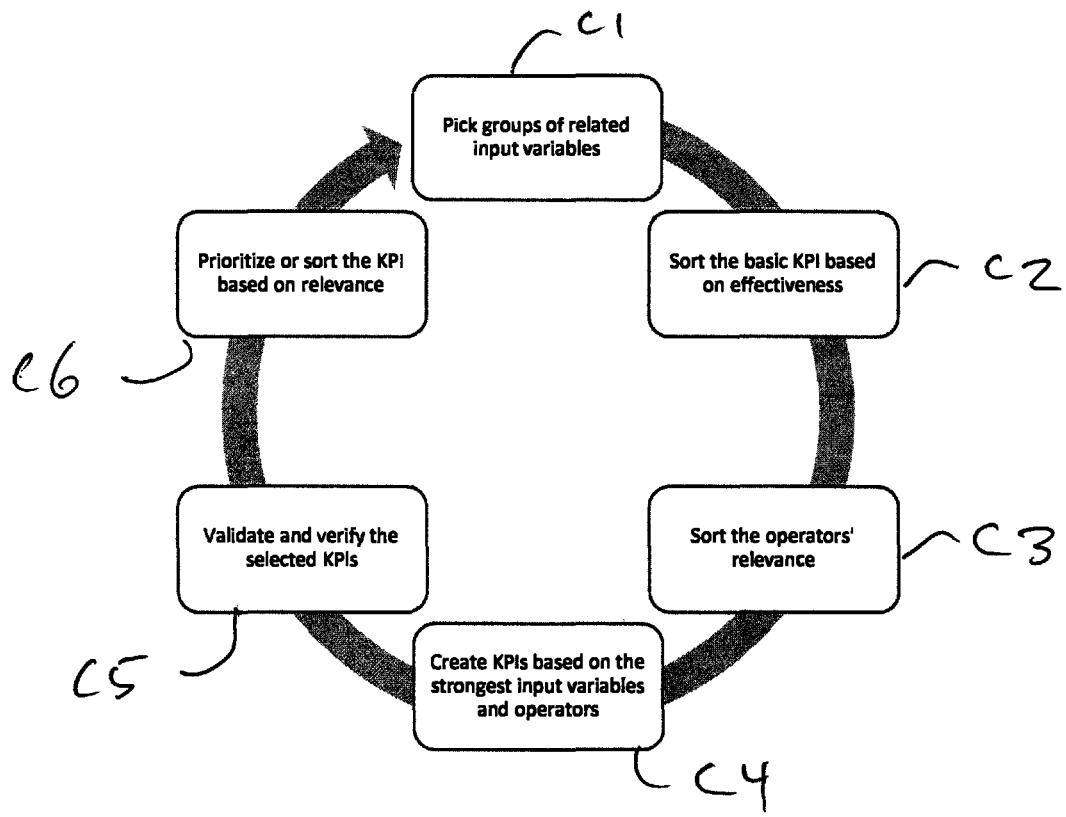
FIG. 3 is a flow diagram illustrating a first KPI-selection process in accordance with an embodiment of the disclosure.

The input variables and operators in the first segment (B1 in FIG. 2) provide a significant variable and operator relationship that can be useful to build the KPIs. The process is shown in FIG. 3. In block C1, the groups of related input variables are determined. In blocks C2 and C3, the data is sorted based on the relationship and operator word strength (C2) and relevance (C3). These text-to-mathematical equations are relatively straightforward, and, in case of ambiguity, all options are tested. In block C4, one or more KPIs are selected, based on the strongest input variables and operators. In block C5, the selected KPIs are validated and verified. In block C6, the KPIs are prioritized and/or sorted based on relevance. The process then returns to block C1, in which the variables and operators may be re-grouped based on the results in block C5. The process is iterated over a few times to yield the most-useful KPIs.

The input variables and operators can be combined in an evolutionary model to create and test new KPIs. The evolutionary algorithm is provided the variables and operators with probabilities associated so that model can converge quickly rather than treating every all combinations equal. Further due to inherent randomness combination not present are also create. The probabilities can be scaled to explore more random combinations or less random combination that control convergence and time.

Figure 4:
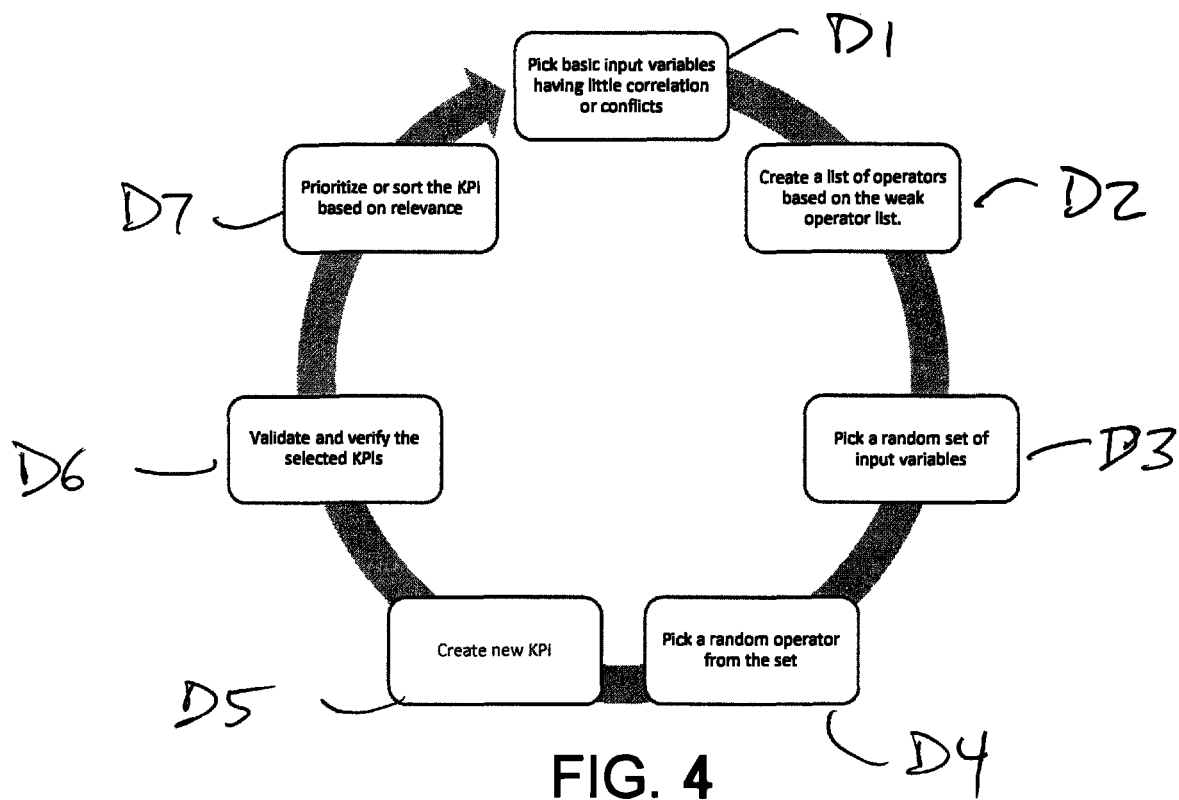
FIG. 4 is a flow diagram illustrating a second KPI-selection process in accordance with an embodiment of the disclosure.

The second segment (B2 in FIG. 2) includes groups of input variables and operators that show weak or conflicting correlations or have some computation relationship words that relate the parameters. FIG. 4 illustrates an example of the PKI-discovery concept employed for the second segment. In blocks D1 and D2, a set of weakly-related input data and an operator set is taken and processed. In blocks D3 and D4, as the set of parameters and computation words are constrained, a random discovery process for input variables and operators is used. That is, the parameters and computational operations are drawn randomly to create a KPI (in block D5), whose effectiveness is then measured in blocks D6 and D7. With a reasonable number of attempts, important KPI can be discovered.

The random-combination approach also can be applied to the other segments (e.g., B1 in FIG. 2). Thus, even among the derived first segment of parameters that show correlations and KPI (B1), a further attempt to create new KPI through a random process can be attempted. The search space can be further reduced as already-created KPI options are removed. The computation options that are applied can be limited to reduce time and increase effectiveness.

The concept is not limited to a KPI that computes "A+B" or "A/B", but it is also applicable to create a KPI involving another dimension, such as time. For example, the above approach can be used to find a time-series KPI, such as "errors per hour" or "errors per packet".

The third segment of parameters (B3 in FIG. 2) show no correlation based on the numerical and text data. It is assumed that there is no reason to try create KPI from these parameters. Thus, typically, this set of parameters is not used. However, because a parameter in this segment might possibly have a correlation in the event that the source-text content contains some previously unidentified relevant information (e.g., because of a possible lack of documentation), in one embodiment of the disclosure, the random-combination approach is also applied to parameters in the third segment.

In one embodiment, the above approach is implemented using genetic or evolutionary algorithms known to those of ordinary skill in the art. There are two basic inputs: (1) the fact or KPI tables and (2) text documentation or human information. The raw-fact tables (which may be referred to as the "input KPIs" or "existing KPIs") numerous sources are the diverse measure that are available. The text from several sources are processed through word vectorization, syntax graphs, and N-grams.

The distance between the facts or KPI tables to various words are computed and ranked. Ranking enable, selection, and segmentation or biasing as discussed above. In one embodiment, a simple cut-off threshold is used to drop the least-relevant (bottom) relationships and thus to keep more-relevant or important information. The word distances are then used to compute distances between the KPIs themselves. Further, in one embodiment, these distances between existing KPIs, and/or between the words and KPIs are converted to probabilities to use in the evolutionary programs, using various scales linearly or non-linearly. Similarly, in one embodiment, the distances between the words and the operators are used to assign probabilities to the various operators.

In one embodiment, for each KPI, these probabilities (and distances) between the KPI to other KPIs and to various possible operators are used to drive a bias on the evolutionary program to reduce the search space. Driving a bias involves providing a probability matrix that favors or biases the variables and operators combined together. The bias helps certain variables to be combined together more often than others. The existing KPI along with the new KPI can then be crossed over and mutated to derive additional KPIs.

The approach of applying evolutionary programming with a bias provides a significant head start and reduces time to create new KPIs. The evolutionary algorithm's random nature enables it further to create new KPIs even with the low-probability attributes (e.g., segment B3 in FIG. 2). Alternatively, as discussed above, the data can be used to segment the probabilities, so that all of the low probabilities can be tried subsequently in a separate attempt.

For the evolutionary algorithms, the cost function is the predictive model using a classifier for a target variable. The model uses the existing list of KPI along with the various new test KPI (also known as "tKPI"). The model's score is compared other models in this generation (and also the parent generation) to pick models that are equal or better and the specific test KPIs from these models are selected. The test KPIs that are not selected are discarded. The test KPIs that are selected are converted to newly created KPIs called "created KPIs" or "cKPIs". The created KPIs are promoted to regular KPIs for the next generation.

To build a model, an automated-model-pipeline approach is used. The term "automated pipeline" refers to a pipeline architecture built to model data automatically for various characteristics such as histograms, variance, covariance, PCA, and the like in a structured fashion. Using the pipeline approach, one can perform dimensionality reduction, machine-learning model selection, and model optimization to achieve the end goal, which is to discover useful KPIs or build useful predictive models. Provided input KPIs, the pipeline automatically builds the best model possible. The pipeline selects the KPIs based on basic-statistics concepts of histogram, variance, PCA, and the like. Subsequently various models of different algorithms and/or different parameters are built and validated, and the best model is output.

Once a KPI is discovered, created, and/or selected, the final step is to measure its correlation through various metrics, such as covariance or principal component analysis (PCA), to compare its relevance with that of existing basic KPIs, or to find its relevance to the measured entity that is the target variable for a final determination. In one embodiment, the above steps are iterated over and over to improve the KPI selection.

Figure 5:
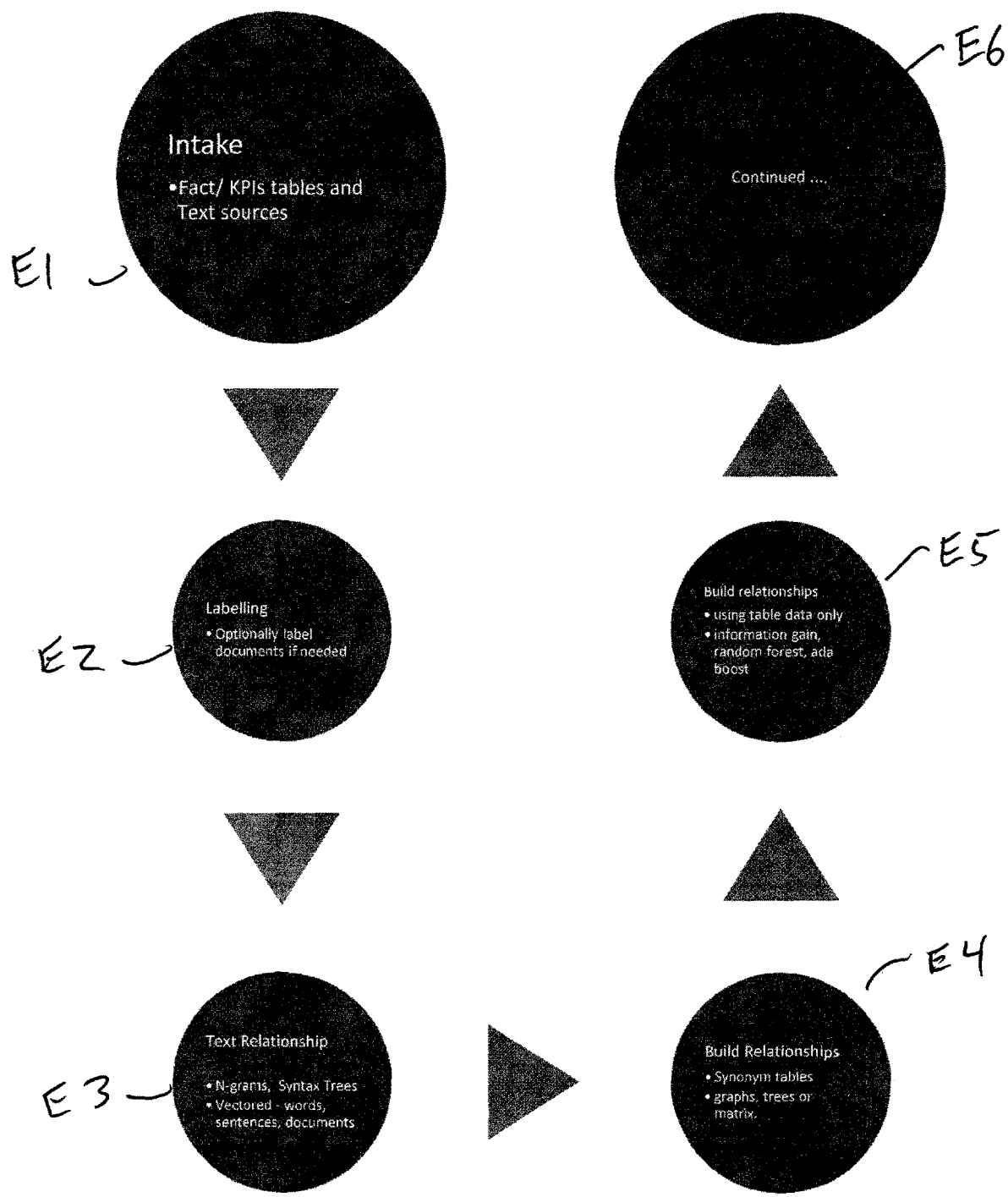
FIGS. 5 and 6 are flow diagrams illustrating a third KPI-selection process in accordance with an embodiment of the disclosure.
Figure 6:
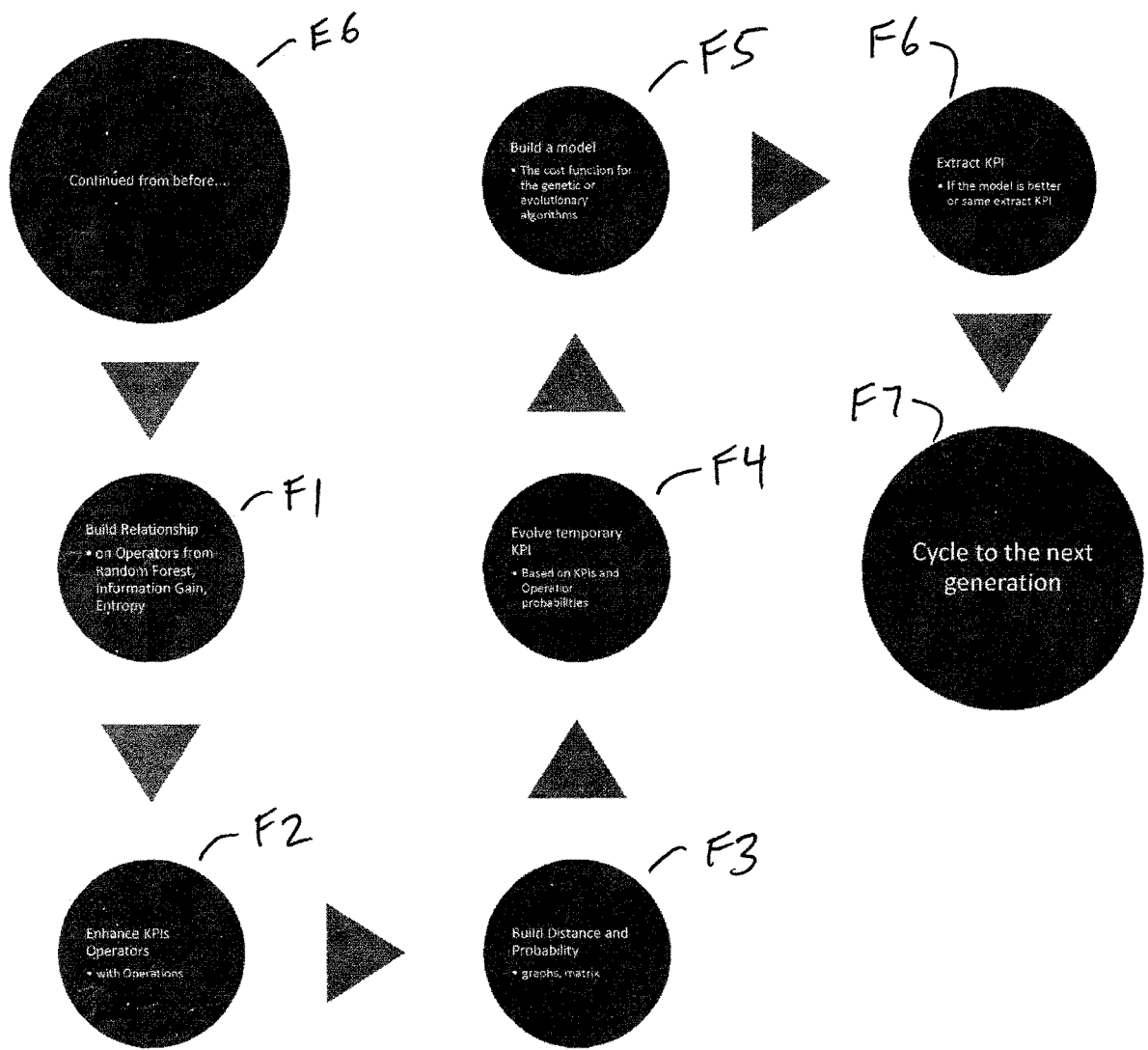

As shown in FIGS. 5 and 6, the KPI-discovery pipeline process includes the following steps:
1. Intake (block E1).
    a. Input all the fact tables or KPIs tables.
    b. Input the various text sources.
2. Label documents (block E2).
    a. Optionally label documents if needed
3. Calculate text relationship (block E3).
    a. Non-Vectored
        i. N-grams of the various texts
        ii. Syntax trees
    b. Vectored
        i. Word, Sentences, Document vectorization
4. Build relationships (a.k.a. correlations) (blocks E4 and E5).
    a. Synonym tables
    b. Fact or KPI Relationships graphs, trees, or matrix.
    c. The relationships can be computed from the input variable itself using Principle component analysis, decision tree and the like. This input is also taken into processing.
    d. Bottom-Up approach. Find the distance of the variable to target variable, and find the distance of each KPI to each other KPI and also the list of higher-level KPIs that relate these KPIs. In one embodiment, the distances between words (sentences or documents) are used to create groups. Find higher-level KPIs that relate multiple of the basic KPIs.
    e. Top-Down approach. Compute distances from the target variable down to the available KPIs, to create a list of variables closest to the target KPIs to the computed variable. To compute those KPIs, a set of lower-level KPIs is computed. This is repeated until the needed KPIs are found. This information is then used to assign the probability to various variables or KPIs along the hierarchy. These probabilities can be used to bias or pick variable to tested, modelled, combined with other variables to create a new KPI.
5. Enhance relationships/correlations (blocks F1 and F2).
    a. The fact or KPI relationship can be enhanced through various techniques such a cut-off, further grouping, biasing, and the like.
6. Create temporary KPIs (blocks F3 and F4).
    a. Based on the KPIs and Operator relationship.
7. Compute the cost function for the genetic or evolutionary algorithms (block F5).

a. Predictive model for the target variables
8. Extract the feature list from the model (block F6).
   a. If the features list uses the new created KPIs (cKPIs) and improves the model, then the new created KPIs (cKPIs) are kept. If not, then they are discarded or can be left in place.
9. Evolve to the next generation (block F7).
   a. The set of old and new created KPIs together are then moved to the next generation, where the process is repeated. When going from one generation to the next, a set of crossover and mutations are applied.
   b. This enables a new KPI to be built on top of existing KPIs.

The exit criteria is that the all of the high-probability KPI relationships have been explored. Even after exploring the high-probability KPIs, a certain number of iterations can be applied purely based on crossover and mutation, as long as the model improves. If the model does not continue to improve, then the KPI creation is stopped.

The successful application to other domains is dependent upon the quality of the surrounding literature in a reasonable volume. The literature includes emails, design documents, development documents, process or operational documents, business documents, and the like.

Exemplary Work Flow

In one exemplary embodiment, a basic algebra text such a middle-school math textbook or Wikipedia provides the data to create synonyms for various mathematical operators (block E1). This list is combined further refined by human intervention, because this is one-time effort. For specific domains, this could be further refined through addition processing or human intervention.

The inputs from the various document sources, such as data dictionaries, internal working wiki pages, and the like are processed through word vectorization (block E3). The vectored words are then used to create synonyms for the various existing keywords (block E4). These synonyms are then substituted for the existing keywords, and the text is processed through word vectorization again (block E5). This process can be repeated a few times, if needed.

The various words are then grouped hierarchically using word distances (block F3). This creates a hierarchy of words with the relationships between them. In this case, the hierarchies of interest are (1) one that is rooted at the target output KPI (or column) or other existing KPIs and finally (2) groups that contain multiple KPIs.

From these groups, the distances to other KPI and the related operators are measured and computed as probability scores for these combinations (block F3). Thus, a specific list of operations can be created, and new temporary KPIs created (block F4). Based on the scores, these temporary KPIs could be good KPIs. The probabilities for the temporary KPIs and operators are then inputted to an evolutionary algorithm to create various sets of new temporary KPIs. The probability scores set up a bias that helps the search and quickens the discovery process. A certain number of random KPIs are created and then are evaluated.

At this point, the existing KPIs along with the new temporary KPIs are fed into the automated pipeline to generate a model that predicts the target variable (block F5). This model's score is compared to the existing best score, and the model is then further used or discarded. A model that is equal or better than the current model is used to extract new temporary KPIs (block F6). This process can iterate over to identify the strength of the new temporary KPIs.

The KPIs that have been generated by the automated pipeline are then added to the list of existing KPIs. That is, the test KPIs are converted to regular KPIs. The word that best represents the KPIs used in the operation, along with the operation, are identified using the word distance. This set of KPIs is named after that word (block F6).

This process is repeated again and again (block F7) until either (1) the number of allowed iterations is reached, or (2) the models do not get any better for certain number of iterations.

The resulting KPIs and the final model are the final outputs.

Alternative Embodiments

It should be understood that appropriate hardware, software, or a combination of both hardware and software is provided to effect the processing described above, in the various embodiments of the disclosure. It should further be recognized that a particular embodiment might support one or more of the modes of operation described herein, but not necessarily all of these modes of operation.

Embodiments of the present disclosure can take the form of methods and apparatuses for practicing those methods. Such embodiments can also take the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing embodiments of the disclosure. Embodiments of the disclosure can also be embodied in the form of program code, for example, stored in a non-transitory machine-readable storage medium including being loaded into and/or executed by a machine, wherein, when the program code is loaded into and executed by a machine, such as a computer, the machine becomes an apparatus for practicing embodiments of the disclosure. When implemented on a general-purpose processor, the program code segments combine with the processor to provide a unique device that operates analogously to specific logic circuits.

It will be appreciated by those skilled in the art that although the functional components of the exemplary embodiments of the system described herein may be embodied as one or more distributed computer program processes, data structures, dictionaries and/or other stored data on one or more conventional general-purpose computers (e.g., IBM-compatible, Apple Macintosh, and/or RISC microprocessor-based computers), mainframes, minicomputers, conventional telecommunications (e.g., modem, T1, fiber-optic line, DSL, satellite and/or ISDN communications), memory storage means (e.g., RAM, ROM) and storage devices (e.g., computer-readable memory, disk array, direct access storage) networked together by conventional network hardware and software (e.g., LAN/WAN network backbone systems and/or Internet), other types of computers and network resources may be used without departing from the present disclosure. One or more networks discussed herein may be a local area network, wide area network, internet, intranet, extranet, proprietary network, virtual private network, a TCP/IP-based network, a wireless network (e.g., IEEE 802.11 or Bluetooth), an e-mail based network of e-mail transmitters and receivers, a modem-based, cellular, or mobile telephonic network, an interactive telephonic network accessible to users by telephone, or a combination of one or more of the foregoing.

Embodiments of the disclosure as described herein may be implemented in one or more computers residing on a network transaction server system, and input/output access to embodiments of the disclosure may include appropriate hardware and software (e.g., personal and/or mainframe computers provisioned with Internet wide area network communications hardware and software (e.g., CQI-based, FTP, Netscape Navigator™, Mozilla Firefox™, Microsoft Internet Explorer™, Google Chrome™, or Apple Safari™ HTML Internet-browser software, and/or direct real-time or near-real-time TCP/IP interfaces accessing real-time TCP/IP sockets) for permitting human users to send and receive data, or to allow unattended execution of various operations of embodiments of the disclosure, in real-time and/or batch-type transactions. Likewise, a system consistent with the present disclosure may include one or more remote Internet-based servers accessible through conventional communications channels (e.g., conventional telecommunications, broadband communications, wireless communications) using conventional browser software (e.g., Netscape Navigator™, Mozilla Firefox™, Microsoft Internet Explorer™, Google Chrome™, or Apple Safari™). Thus, embodiments of the present disclosure may be appropriately adapted to include such communication functionality and Internet browsing ability. Additionally, those skilled in the art will recognize that the various components of the server system of the present disclosure may be remote from one another, and may further include appropriate communications hardware/software and/or LAN/WAN hardware and/or software to accomplish the functionality herein described.

Each of the functional components of embodiments of the present disclosure may be embodied as one or more distributed computer-program processes running on one or more conventional general purpose computers networked together by conventional networking hardware and software. Each of these functional components may be embodied by running distributed computer-program processes (e.g., generated using "full-scale" relational database engines such as IBM DB2™, Microsoft SQL Server™, Sybase SQL Server™, or Oracle 10g™ database managers, and/or a JDBC interface to link to such databases) on networked computer systems (e.g., including mainframe and/or symmetrically or massively-parallel computing systems such as the IBM SB2™ or HP 9000™ computer systems) including appropriate mass storage, networking, and other hardware and software for permitting these functional components to achieve the stated function. These computer systems may be geographically distributed and connected together via appropriate wide- and local-area network hardware and software. In one embodiment, data stored in the database or other program data may be made accessible to the user via standard SQL queries for analysis and reporting purposes.

Primary elements of embodiments of the disclosure may be server-based and may reside on hardware supporting an operating system such as Microsoft Windows NT/2000™, Linux, or UNIX.

Components of a system consistent with embodiments of the disclosure may include mobile and non-mobile devices. Mobile devices that may be employed in embodiments of the present disclosure include personal digital assistant (PDA) style computers, e.g., as manufactured by Apple Computer, Inc. of Cupertino, Calif., or Palm, Inc., of Santa Clara, Calif., and other computers running the Android, Symbian, RIM Blackberry, Palm webOS, or iOS operating systems, Windows CET™ handheld computers, or other handheld computers (possibly including a wireless modem), as well as wireless, cellular, or mobile telephones (including GSM phones, J2ME and WAP-enabled phones, Internet-enabled phones and data-capable smart phones), one- and two-way paging and messaging devices, laptop computers, etc. Other telephonic network technologies that may be used as potential service channels in a system consistent with embodiments of the disclosure include 2.5G cellular network technologies such as GPRS and EDGE, as well as 3G technologies such as CDMA1×RTT and WCDMA2000, and 4G technologies. Although mobile devices may be used in embodiments of the disclosure, non-mobile communications devices are also contemplated by embodiments of the disclosure, including personal computers, Internet appliances, set-top boxes, landline telephones, etc. Clients may also include a PC that supports Apple Macintosh™, Microsoft Windows 95/98/NT/ME/CE/2000/XP/Vista/7™, a UNIX Motif workstation platform, or other computer capable of TCP/IP or other network-based interaction. In one embodiment, no software other than a web browser may be required on the client platform.

Alternatively, the aforesaid functional components may be embodied by a plurality of separate computer processes (e.g., generated via dBase™, Xbase™, MS Access™ or other "flat file" type database management systems or products) running on IBM-type, Intel Pentium™ or RISC microprocessor-based personal computers networked together via conventional networking hardware and software and including such other additional conventional hardware and software as may be necessary to permit these functional components to achieve the stated functionalities. In this alternative configuration, because such personal computers typically may be unable to run full-scale relational database engines of the types presented above, a non-relational flat file "table" (not shown) may be included in at least one of the networked personal computers to represent at least portions of data stored by a system according to embodiments of the present disclosure. These personal computers may run the Unix, Microsoft Windows NT/2000™, Windows 95/98/NT/ME/CE/2000/XP/Vista/7™, or MacOS operating systems. The aforesaid functional components of a system according to the disclosure may also include a combination of the above two configurations (e.g., by computer program processes running on a combination of personal computers, RISC systems, mainframes, symmetric or parallel computer systems, and/or other appropriate hardware and software, networked together via appropriate wide- and local-area network hardware and software).

A system according to embodiments of the present disclosure may also be part of a larger system including multi-database or multi-computer systems or "warehouses" wherein other data types, processing systems (e.g., healthcare, transaction, financial, administrative, statistical, data extracting and auditing, data transmission/reception, and/or accounting support and service systems), and/or storage methodologies may be used in conjunction with those of the present disclosure to achieve additional functionality.

In one embodiment, source code may be written in an object-oriented programming language using relational databases. Such an embodiment may include the use of programming languages such as C++ and toolsets such as Microsoft's .Net™ framework. Other programming languages that may be used in constructing a system according to embodiments of the present disclosure include Java, HTML, Perl, UNIX shell scripting, assembly language, Fortran, Pascal, Visual Basic, and QuickBasic. Those skilled in the art will recognize that embodiments of the present disclosure may be implemented in hardware, software, or a combination of hardware and software.

Accordingly, the terms "computer" or "system," as used herein, should be understood to mean a combination of hardware and software components including at least one machine having a processor with appropriate instructions for controlling the processor. The singular terms "computer" or "system" should also be understood to refer to multiple hardware devices acting in concert with one another, e.g., multiple personal computers in a network; one or more personal computers in conjunction with one or more other devices, such as a router, hub, packet-inspection appliance, or firewall; a residential gateway coupled with a set-top box and a television; a network server coupled to a PC; a mobile phone coupled to a wireless hub; and the like. The term "processor" should be construed to include multiple processors operating in concert with one another.

It should also be appreciated from the outset that one or more of the functional components may alternatively be constructed out of custom, dedicated electronic hardware and/or software, without departing from the present invention. Thus, embodiments of the invention are intended to cover all such alternatives, modifications, and equivalents as may be included within the spirit and broad scope of the disclosure.

It should be understood that various changes in the details, materials, and arrangements of the parts which have been described and illustrated in order to explain the nature of this disclosure may be made by those skilled in the art without departing from the scope of the disclosure.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments.

Although the disclosure is described herein with reference to specific embodiments, various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all the claims.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the disclosure.

Although the disclosure has been set forth in terms of the exemplary embodiments described herein and illustrated in the attached drawings, it is to be understood that such disclosure is purely illustrative and is not to be interpreted as limiting. Consequently, various alterations, modifications, and/or alternative embodiments and applications may be suggested to those skilled in the art after having read this disclosure. Accordingly, it is intended that the disclosure be interpreted as encompassing all alterations, modifications, or alternative embodiments and applications as fall within the true spirit and scope of this disclosure.

All embodiments that are within the scope of the claims are believed to meet all of the requirements for patentability, including the enablement and written-description requirements. To the extent that any claimed embodiment fails to meet such requirements, such embodiments are hereby disclaimed.

We claim:

1. A method of statistical data processing for creating an optimized key performance indicator, comprising the steps of:
   providing a data set having input variables;
   automatically inputting the data set to a machine-learning algorithm configured to identify correlations between the input variables using a processor;
   using an evolutionary algorithm on the identified correlations to reduce a search space of the data set; and
   using the reduced search space of identified correlations, to automatically create a key performance indicator from a given set of input variables.

2. The method of statistical data processing of claim 1, further comprising generating a probabilistic bias, and inputting the probabilistic bias to the machine-learning algorithm.

3. The method of statistical data processing of claim 1, wherein the machine-learning algorithm is configured to extract a relationship between two or more of the input variables.

4. The method of statistical data processing of claim 1, wherein the machine-learning algorithm is configured to extract a correlation between at least one input variable and an operator.

5. The method of statistical data processing of claim 1, wherein the machine-learning algorithm comprises at least one of a Random-Forest algorithms, a decision tree, principal-component analysis, linear regression, or a generalized linear model.

6. The method of statistical data processing of claim 1, wherein the machine-learning algorithm is configured to calculate one or more cost functions, and the key performance indicator is generated using the one or more calculated cost functions.

7. A method of statistical data processing, comprising:
   providing a data set having text comprising input variables that are related by one or more operators;
   processing the text to identify one or more first correlations between the input variables and the one or more operators;
   using the identified one or more first correlations to reduce a search space of the data set;
   creating a bias toward one or more of the input variables; and
   using the reduced search space of the data set and created bias to automatically generate a key performance indicator from the input variables.

8. The method of statistical data processing of claim 7, further comprising:
   inputting the data set to a machine-learning algorithm to identify one or more second correlations between the input variables and the one or more operators, and
   using the identified second correlations to automatically generate a second key performance indicator from the input variables.

9. The method of statistical data processing of claim 8, wherein the machine-learning algorithm comprises an automated pipeline that creates machine-learning models using the one or more cost functions.

10. The method of statistical data processing of claim 8, wherein:
   processing the text to identify one or more first correlations between the input variables and the one or more operators comprises determining a natural-language-processing probability;
   creating a bias toward one or more of the input variables is performed using the determined natural-language-processing probability; and
   generating a key performance indicator from the input variables comprises randomly selecting the key performance indicator using the created bias.

11. The method of statistical data processing of claim 7, wherein processing the text comprises automatically inputting the text to a natural-language-processing algorithm configured to identify the one or more first correlations between the input variables and the one or more operators.

12. A statistical-data-processing system comprising:
   one or more processors; and
   a non-transitory computer-readable medium that has executable code stored thereon, which, when executed by the one or more processors, causes the statistical-data-processing system to carry out the following process:
      retrieving a data set having text comprising input variables that are related by one or more operators;
      processing the text to identify one or more first correlations between the input variables and the one or more operators;
      using the identified one or more first correlations to reduce a search space associated with the data set;
      creating a bias toward one or more of the input variables; and
      using the reduced search space associated with the data set and created bias to automatically generate a key performance indicator from the input variables.

13. A method of statistical data processing, comprising:
   providing a data set having text comprising input variables that are related by one or more operators;
   processing the text to identify one or more first correlations between the input variables and the one or more operators;
   at least one of: (i) using the identified one or more first correlations to reduce a search space of the data set; and (ii) to create a bias toward one or more of the input variables; and
   using the reduced search space of the data set or created bias to automatically generate a key performance indicator from the input variables,
   wherein processing the text comprises automatically inputting the text to a natural-language-processing algorithm configured to identify the one or more first correlations between the input variables and the one or more operators, and
   wherein the natural-language-processing algorithm is configured to find correlations between (i) a possible new key performance indicator and (ii) at least one of (1) an existing key performance indicator, (2) a target key performance indicator, and (3) an input variable, and using the found correlations, to compute a score between the possible new key performance indicator and (ii) at least one of (1) an existing key performance indicator, (2) a target key performance indicator, and (3) an input variable.

14. The method of statistical data processing of claim 13, wherein the natural-language-processing algorithm computes the score by calculating (1) a distance, (2) a count, and/or (3) a likelihood using the identified correlations, probability for each possible new key performance indicator.

* * * * *